United States Patent
Alonso-Miralles et al.

(10) Patent No.: US 12,448,935 B2
(45) Date of Patent: Oct. 21, 2025

(54) LOW-FREQUENCY ACOUSTIC CENTER BODY

(71) Applicant: ROHR, INC., Chula Vista, CA (US)

(72) Inventors: Jose S. Alonso-Miralles, Chula Vista, CA (US); Ryan M. Robinson, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 18/885,392

(22) Filed: Sep. 13, 2024

(65) Prior Publication Data

US 2025/0003374 A1    Jan. 2, 2025

Related U.S. Application Data

(62) Division of application No. 18/420,473, filed on Jan. 23, 2024, now Pat. No. 12,116,955, which is a
(Continued)

(51) Int. Cl.
*F02K 1/82*    (2006.01)
*B64D 33/02*   (2006.01)
(Continued)

(52) U.S. Cl.
CPC ............... *F02K 1/827* (2013.01); *F02K 1/04* (2013.01); *F02K 1/44* (2013.01);
(Continued)

(58) Field of Classification Search
CPC ... F02K 1/04; F02K 1/44; F02K 1/827; F05D 2230/54; F05D 2230/60; F05D 2240/1281;
(Continued)

(56) References Cited

U.S. PATENT DOCUMENTS

| 3,542,152 A | 11/1970 | Adamson et al. |
| 3,734,234 A | 5/1973 | Wirt |

(Continued)

FOREIGN PATENT DOCUMENTS

| EP | 2960480 | 12/2015 |
| EP | 3364407 | 8/2018 |
| GB | 1406844 | 9/1975 |

OTHER PUBLICATIONS

European Patent Office, European Search Report dated May 16, 2023 in Application No. 22195368.0.
(Continued)

*Primary Examiner* — Jason H Duger
(74) *Attorney, Agent, or Firm* — SNELL & WILMER L.L.P.

(57) ABSTRACT

A center plug includes an inner skin, the inner skin extending along an axial centerline; an outer skin positioned radially outside the inner skin; a forward bulkhead connected to and extending radially outward from the inner skin; an aft bulkhead connected to and extending radially outward from the inner skin; and an acoustic panel, the acoustic panel including a first sheet having a first plurality of perforated walls and a first plurality of non-perforated walls, a second sheet having a second plurality of perforated walls and a second plurality of non-perforated walls, the first sheet being sandwiched together with the second sheet to form an N-shaped structure having a combined plurality of perforated walls and a combined plurality of non-perforated walls.

4 Claims, 10 Drawing Sheets

Related U.S. Application Data division of application No. 17/473,817, filed on Sep. 13, 2021, now Pat. No. 12,078,125.

(51) Int. Cl.
  *F02K 1/04* (2006.01)
  *F02K 1/44* (2006.01)
  *G10K 11/172* (2006.01)

(52) U.S. Cl.
  CPC .. *B64D 2033/0206* (2013.01); *F05D 2230/54* (2013.01); *F05D 2230/60* (2013.01); *F05D 2240/1281* (2013.01); *F05D 2250/183* (2013.01); *F05D 2250/191* (2013.01); *F05D 2250/314* (2013.01); *F05D 2250/38* (2013.01); *F05D 2250/75* (2013.01); *F05D 2260/963* (2013.01); *G10K 11/172* (2013.01)

(58) Field of Classification Search
  CPC ......... F05D 2250/183; F05D 2250/191; F05D 2250/314; F05D 2250/38; F05D 2250/75; F05D 2260/963; G10K 11/172; B64D 2033/0206

See application file for complete search history.

(56) References Cited

U.S. PATENT DOCUMENTS

| | | | |
|---|---|---|---|
| 3,831,710 A | 8/1974 | Wirt | |
| 3,913,702 A | 10/1975 | Wirt et al. | |
| 4,240,519 A | 12/1980 | Wynosky | |
| 4,265,955 A * | 5/1981 | Harp | B32B 15/06 428/116 |
| 4,298,090 A | 11/1981 | Chapman | |
| 4,944,362 A | 7/1990 | Motsinger et al. | |
| 8,479,877 B2 | 7/2013 | Todorovic | |
| 9,051,899 B2 | 6/2015 | Malot et al. | |
| 9,062,610 B2 | 6/2015 | Morvant | |
| 9,261,008 B2 | 2/2016 | Mecuson et al. | |
| 9,708,930 B2 | 7/2017 | Koroly | |
| 9,761,216 B2 | 9/2017 | Nampy et al. | |
| 9,978,354 B2 | 5/2018 | Nampy | |
| 10,414,481 B2 | 9/2019 | Pierick et al. | |
| 10,676,171 B2 | 6/2020 | Narayanan Nampy et al. | |
| 10,695,986 B2 | 6/2020 | Gurney et al. | |
| 11,060,480 B2 | 7/2021 | Foutch et al. | |
| 11,398,214 B2 | 7/2022 | Gurvich et al. | |
| 11,428,191 B1 | 8/2022 | Alonso-Miralles et al. | |
| 2007/0256889 A1 * | 11/2007 | Yu | F02K 1/04 181/214 |
| 2010/0012423 A1 | 1/2010 | Mercat | |
| 2013/0306403 A1 | 11/2013 | Todorovic | |
| 2015/0367953 A1 | 12/2015 | Yu et al. | |
| 2017/0167291 A1 * | 6/2017 | Koroly | B64C 1/40 |
| 2018/0142621 A1 | 5/2018 | Biset et al. | |
| 2018/0142622 A1 | 5/2018 | Biset et al. | |
| 2018/0363558 A1 | 12/2018 | Weaver et al. | |
| 2019/0112066 A1 | 4/2019 | Alonso-Miralles | |
| 2019/0300188 A1 | 10/2019 | Gurvich et al. | |
| 2020/0088135 A1 | 3/2020 | Lopez et al. | |
| 2020/0191091 A1 | 6/2020 | Gurvich et al. | |
| 2020/0386187 A1 | 12/2020 | Kelford et al. | |
| 2021/0039349 A1 | 2/2021 | Gurvich et al. | |
| 2022/0199062 A1 | 6/2022 | Quesada et al. | |

OTHER PUBLICATIONS

European Patent Office, European Partial Search Report dated Feb. 15, 2023 in Application No. 22195368.0.

USPTO; Notice of Allowance dated Nov. 8, 2023 in U.S. Appl. No. 17/473,817.

USPTO; Requirement for Restriction/Election dated Sep. 27, 2023 in U.S. Appl. No. 17/473,817.

USPTO; Notice of Allowance dated Jun. 24, 2024 in U.S. Appl. No. 18/420,473.

\* cited by examiner

LOW-FREQUENCY ACOUSTIC CENTER BODY

CROSS-REFERENCE TO RELATED APPLICATIONS

This application is a divisional of, claims priority to and the benefit of, U.S. application Ser. No. 18/420,473, filed Jan. 23, 2024, and entitled "LOW-FREQUENCY ACOUSTIC CENTER BODY." The '473 application is a divisional of, and claims priority to and the benefit of, U.S. patent application Ser. No. 17/473,817, filed Sep. 13, 2021, entitled "LOW-FREQUENCY ACOUSTIC CENTER BODY," which issued as U.S. Pat. No. 12,078,125 on Sep. 3, 2024. Each of the foregoing applications are hereby incorporated by reference in their entirety for all purposes.

FIELD

The present disclosure relates generally to an aircraft gas turbine engine exhaust system and, more particularly, to an exhaust nozzle and a center body configured to attenuate low-frequency exhaust noise generated by an engine combustor.

BACKGROUND

The engines of an aircraft propelled by gas turbine engines produce varying amounts of audible noise during takeoff and landing. For example, a gas turbine engine typically operates at or near maximum thrust as the aircraft departs from an airport and at a lower thrust as the aircraft approaches an airport. Some aircraft engine noise can be partially suppressed at the engine nacelle inlet and the exhaust nozzle and center body by noise absorbing structures. These structures can absorb acoustic energy by canceling reflected acoustic waves or by converting acoustic energy into heat. The structures typically consist of a porous skin and three or more non-perforated walls to form one or more chambers. The porous skin and the non-perforated walls of such chambers combine to form a plurality of Helmholtz resonators that resonate in response to certain sound frequencies or certain bands of frequencies and cancel sound waves reflected between the porous face skin and non-perforated walls or subsequently convert the sound energy into heat (via elastic or mechanical hysteresis caused by the resonant response of air within the resonator cavities and of the liner components), and thereby effectively absorb or dissipate at least a portion of generated engine noise.

In general, relatively thin acoustic panels may be utilized to attenuate noise with relatively short wavelengths and high frequencies, whereas relatively thick acoustic panels may be utilized to attenuate noise with relatively long wavelengths and low frequencies. However, as noise wavelengths become longer as a byproduct of new engine designs while space allocation for noise attenuation structures decreases, traditional acoustic panel configurations may not attenuate noise to acceptable levels, which are often mandated by government regulations. To achieve further reductions in the noise levels of gas turbine engines used on modern aircraft, especially during aircraft takeoffs and approaches, it is desirable to dissipate some of the long-wavelength and low-frequency noise generated by the combustor and the exhaust system of a gas turbine engine, particularly where the combustor and exhaust noise has one or more frequencies less than about 1,000 Hz.

SUMMARY

A first center plug for attenuating noise in a gas turbine engine is disclosed. In various embodiments, the center plug includes an inner skin, the inner skin having a substantially cylindrical shape and extending along an axial centerline; an outer skin positioned radially outside the inner skin; a forward bulkhead disposed proximate a forward end of the inner skin, the forward bulkhead connected to and extending radially outward from the inner skin; an aft bulkhead disposed proximate an aft end of the inner skin, the aft bulkhead connected to and extending radially outward from the inner skin; and an acoustic panel disposed within a volume defined by the inner skin, the outer skin and the forward bulkhead and the aft bulkhead, the acoustic panel including a first sheet having a first plurality of perforated walls and a first plurality of non-perforated walls, a second sheet having a second plurality of perforated walls and a second plurality of non-perforated walls, the first sheet being sandwiched together with the second sheet to form an N-shaped structure having a combined plurality of perforated walls and a combined plurality of non-perforated walls.

In various embodiments, the outer skin is connected to and positioned radially outward of the forward bulkhead, the aft bulkhead and the N-shaped structure. In various embodiments, the N-shaped structure defines a resonator cavity having a first sub-cavity, a second sub-cavity and a third sub-cavity and the outer skin includes a perforated surface extending into the first sub-cavity. In various embodiments, the N-shaped structure includes a first perforated wall extending in a radial direction between the inner skin and the outer skin and separating the first sub-cavity and the second sub-cavity. In various embodiments, the first perforated wall is oriented within a first range from about minus ten degrees to about plus ten degrees with respect to the radial direction extending perpendicular to the axial centerline. In various embodiments, the first perforated wall extends perpendicular to the axial centerline.

In various embodiments, the N-shaped structure includes a second perforated wall extending in the radial direction between the inner skin and the outer skin and separating the second sub-cavity and the third sub-cavity. In various embodiments, the first sub-cavity, the second sub-cavity and the third sub-cavity define a length extending along a non-perforated wall, the length being greater than a radial depth of the N-shaped structure. In various embodiments, the non-perforated wall is oriented at an angle within a second range from about forty degrees to about eighty degrees with respect to the axial centerline.

In various embodiments, the acoustic panel includes a third sheet having a third plurality of perforated walls and a third plurality of non-perforated walls sandwiched together with the second sheet to form the N-shaped structure. In various embodiments, the first sheet defines a first repeating structure, the second sheet defines a second repeating structure and the third sheet defines a third repeating structure. In various embodiments, the first repeating structure and the third repeating structure define a first pattern frequency N and the second repeating structure defines a second pattern frequency N/2.

A second center plug for attenuating noise in a gas turbine engine is disclosed. In various embodiments, the center plug includes an inner skin, the inner skin having a substantially cylindrical shape and extending along an axial centerline; an outer skin positioned radially outside the inner skin; a forward bulkhead disposed proximate a forward end of the inner skin, the forward bulkhead connected to and extending radially outward from the inner skin; an aft bulkhead disposed proximate an aft end of the inner skin, the aft bulkhead connected to and extending radially outward from the inner skin; and an acoustic panel disposed within a volume defined by the inner skin, the outer skin and the forward bulkhead and the aft bulkhead, the acoustic panel including a resonator cavity comprised of a plurality of sub-cavities extending along the axial centerline, the plurality of sub-cavities including a first sub-cavity and an Nth sub-cavity spaced an axial distance from the first sub-cavity, a first perforated surface extending through the outer skin and into the first sub-cavity, and a second perforated surface extending through the outer skin and into the Nth sub-cavity, the second perforated surface being spaced the axial distance from the first perforated surface.

In various embodiments, the plurality of sub-cavities is defined by a first plurality of perforated walls oriented within a first range from about minus ten degrees to about plus ten degrees with respect to a radial direction extending perpendicular to the axial centerline. In various embodiments, the plurality of sub-cavities is defined by a second plurality of perforated walls oriented at an angle within a second range from about forty degrees to about eighty degrees with respect to the axial centerline. In various embodiments, the axial distance is selected such that attenuated acoustic waves exiting the second perforated surface are out of phase with non-attenuated acoustic waves transiting downstream of the first perforated surface.

A third center plug for attenuating noise in a gas turbine engine is disclosed. In various embodiments, the center plug includes an inner skin, the inner skin having a substantially cylindrical shape and extending along an axial centerline; an outer skin positioned radially outside the inner skin; a forward bulkhead disposed proximate a forward end of the inner skin, the forward bulkhead connected to and extending radially outward from the inner skin; an aft bulkhead disposed proximate an aft end of the inner skin, the aft bulkhead connected to and extending radially outward from the inner skin; and an acoustic panel disposed within a volume defined by the inner skin, the outer skin and the forward bulkhead and the aft bulkhead, the acoustic panel including a resonator cavity comprised of a plurality of sub-cavities extending axially along the axial centerline and circumferentially about the axial centerline, the plurality of sub-cavities including a first sub-cavity and a second sub-cavity, the first sub-cavity being separated by the second sub-cavity in a circumferential direction by a first perforated wall, a first perforated surface extending in an axial direction and through the outer skin and into the first sub-cavity, a non-perforated surface covering the second sub-cavity and a second perforated surface extending in the axial direction and spaced in the circumferential direction from the first perforated surface by the non-perforated surface.

In various embodiments, the plurality of sub-cavities includes a third sub-cavity separated in the axial direction from the first sub-cavity by a second perforated wall. In various embodiments, the plurality of sub-cavities includes a fourth sub-cavity separated in the axial direction from the second sub-cavity by a third perforated wall. In various embodiments, a flow path through the plurality of sub-cavities extends from the first sub-cavity to the third sub-cavity and from the first sub-cavity to both the second sub-cavity and the fourth sub-cavity.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
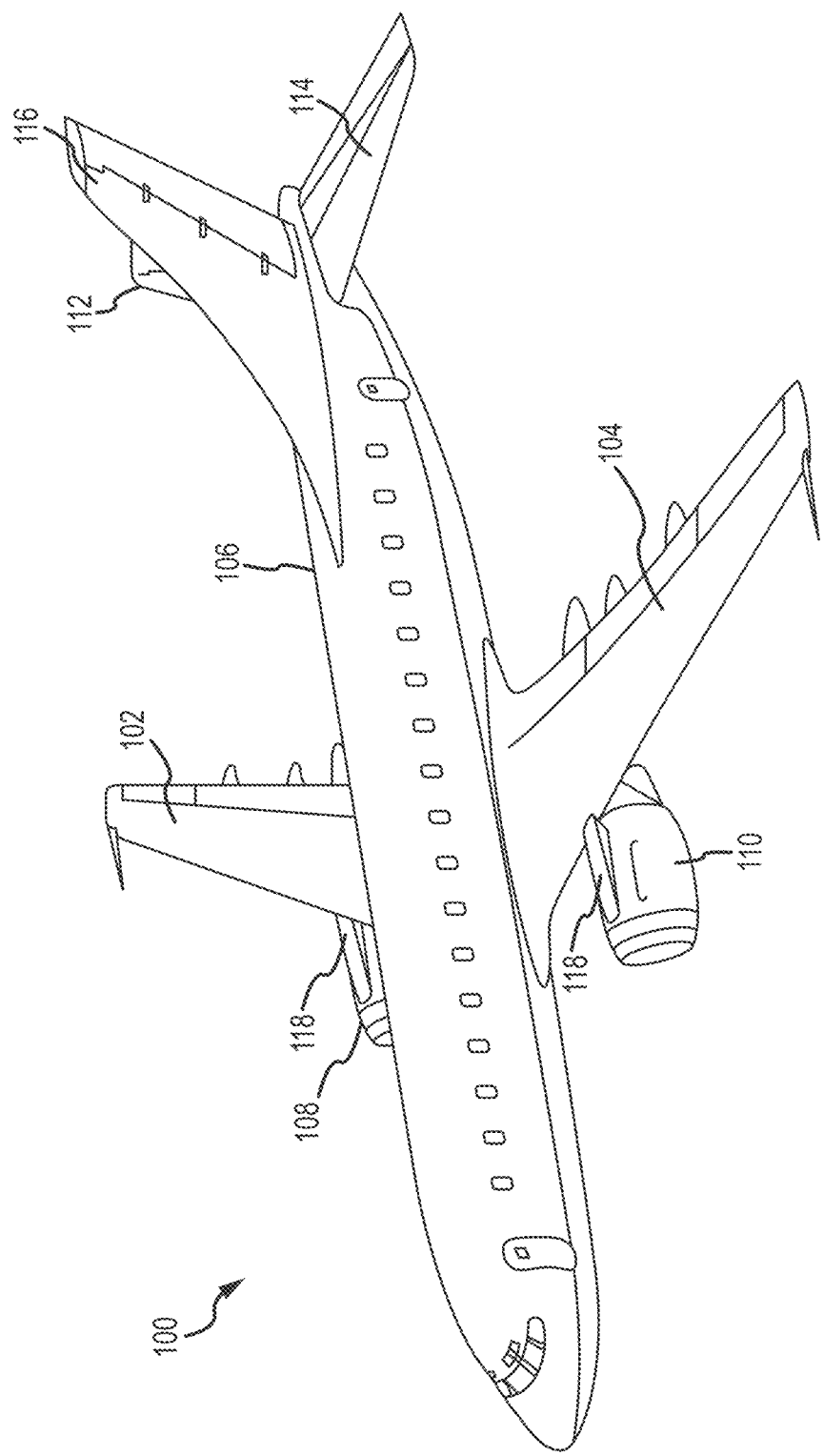
FIG. 1A provides a perspective illustration of an aircraft, in accordance with various embodiments.

Referring now to the drawings, FIG. 1A illustrates an aircraft 100, in accordance with various embodiments. The aircraft 100 is an example of a passenger or transport vehicle in which noise attenuation systems may be implemented in accordance with various embodiments. In an illustrative embodiment, the aircraft 100 has a starboard wing 102 and a port wing 104 attached to a fuselage 106. The aircraft 100 also includes a starboard engine system 108 connected to the starboard wing 102 and a port engine system 110 connected to the port wing 104. In various embodiments, the aircraft 100 also includes a starboard horizontal stabilizer 112, a port horizontal stabilizer 114 and a vertical stabilizer 116. A pylon 118 is used to connect a gas turbine engine within the starboard engine system 108 to the starboard wing 102 and a gas turbine engine within the port engine system 110 to the port wing 104, though, in various embodiments, the gas turbine engines may be connected to other portions of the aircraft 100, such as, for example, to the port and starboard sides of the fuselage 106.

Figure 1B:
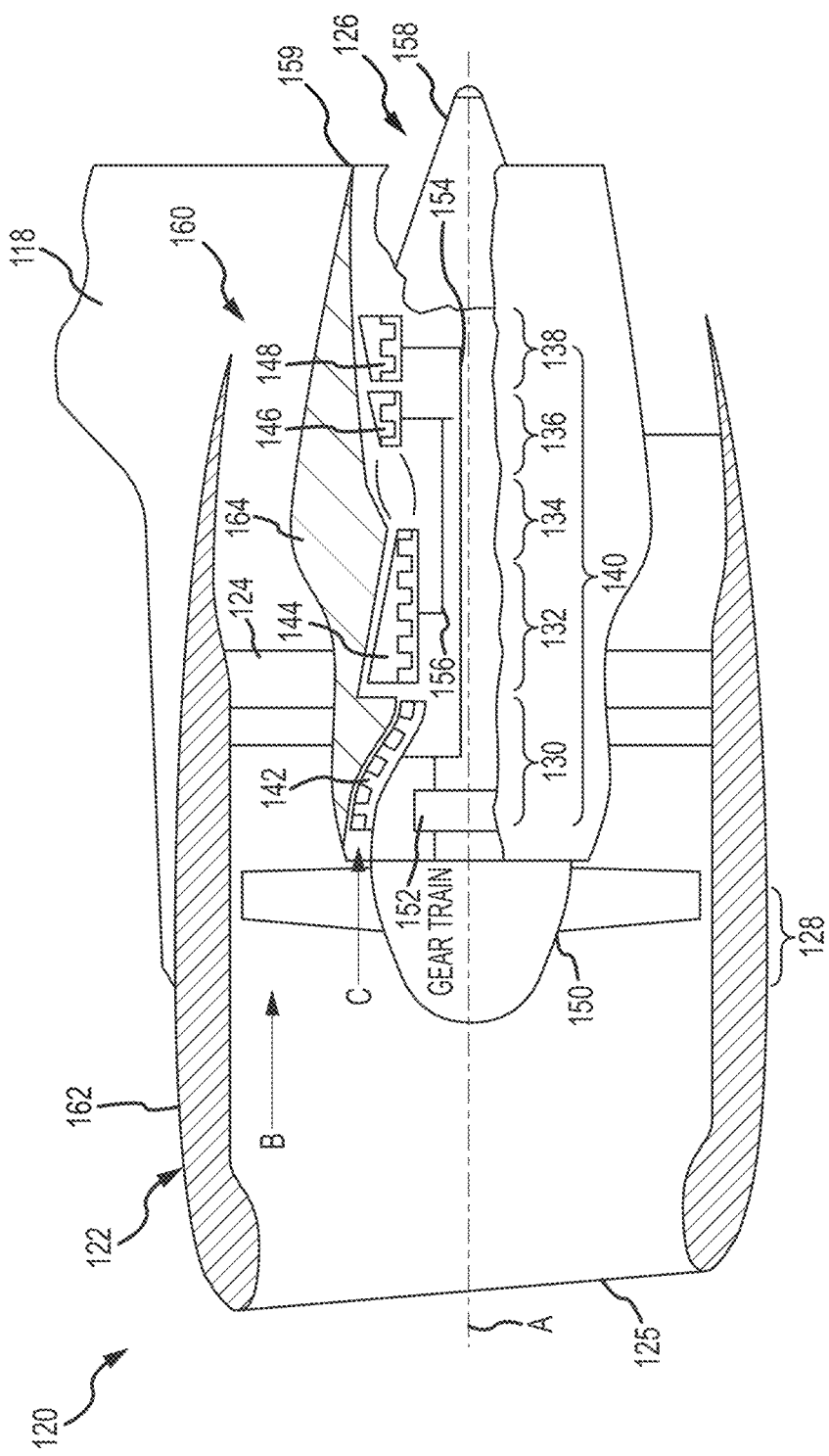
FIG. 1B provides a side cutaway illustration of a propulsion system for the aircraft illustrated in FIG. 1A, in accordance with various embodiments.

Referring now to FIG. 1B, a side cutaway illustration of a gas turbine engine system 120, such as, for example, either of the starboard engine system 108 or the port engine system 110, is provided. The gas turbine engine system 120 includes the pylon 118 and a gas turbine engine 122 (e.g., a propulsion system) such as, for example, a geared turbofan engine that uses an outlet guide vane 124 (OGV) (or a plurality of outlet guide vanes) to structurally connect a fan module to a core engine module as well as redirect the incoming fan flow to the OGV. The gas turbine engine 122 is mounted to the pylon 118, which may be mounted to or otherwise configured with an aircraft airframe. Examples of an aircraft airframe include, but are not limited to, an aircraft wing (e.g., the starboard wing 102 or the port wing 104) or an aircraft fuselage (e.g., the fuselage 106).

The gas turbine engine 122 extends along an axial centerline A between an airflow inlet 125 and a core exhaust system 126. The gas turbine engine 122 includes a fan section 128, a low-pressure compressor section 130 (LPC), a high-pressure compressor section 132 (HPC), a combustor section 134, a high-pressure turbine section 136 (HPT) and a low-pressure turbine section (LPT) 138. The engine sections are typically arranged sequentially along the axial centerline A. The low-pressure compressor section 130 (LPC), the high-pressure compressor section 132 (HPC), the combustor section 134, the high-pressure turbine section 136 (HPT) and the low-pressure turbine section 138 (LPT) form a core 140 (or an engine core) of the gas turbine engine 122.

Each of the low-pressure compressor section 130 (LPC), the high-pressure compressor section 132 (HPC), the high-pressure turbine section 136 (HPT) and the low-pressure turbine section 138 (LPT) typically include a rotor having a plurality of rotor blades arranged circumferentially around and connected to one or more respective rotor disks—e.g., a low-pressure compressor rotor 142, a high-pressure compressor rotor 144, a high-pressure turbine rotor 146 and a low-pressure turbine rotor 148. A fan rotor 150 is connected to a gear train 152. The gear train 152 and the low-pressure compressor rotor 142 are connected to and driven by the low-pressure turbine rotor 148 through a low-speed shaft 154 (or a low-speed spool). The high-pressure compressor rotor 144 is connected to and driven by the high-pressure turbine rotor 146 through a high-speed shaft 156 (or a high-speed spool).

Air enters the gas turbine engine 122 through the airflow inlet 125 and is directed through the fan section 128 and into a core gas flow path C and a bypass gas flow path B. The air within the core gas flow path C may be referred to as "core air." The air within the bypass gas flow path B may be referred to as "bypass air." The core air is directed through the low-pressure compressor section 130, the high-pressure compressor section 132, the combustor section 134, the high-pressure turbine section 136 and the low-pressure turbine section 138 and exits the gas turbine engine 122 through the core exhaust system 126, which includes an exhaust center body 158 surrounded by an exhaust nozzle 159. Within the combustor section 134, fuel is injected into and mixed with the core air and ignited to provide a hot airstream that drives the turbine sections. The bypass air is directed through the bypass gas flow path B, and out of the gas turbine engine 122 through a bypass exhaust nozzle 160 to provide forward engine thrust. The bypass air may also or alternatively be directed through a thrust reverser to provide reverse engine thrust. A fan nacelle 162 is typically employed to surround the various sections of the gas turbine engine 122 and a core nacelle 164 is typically employed to surround the various sections of the core 140.

Figure 2:
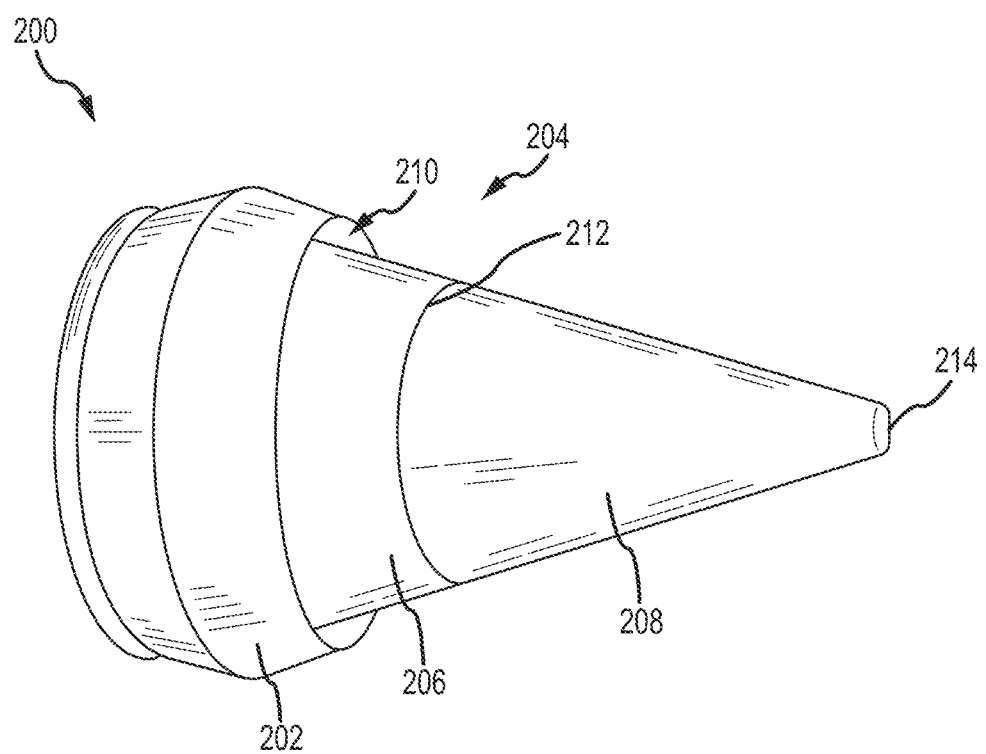
FIG. 2 provides a perspective view of an exhaust portion of a gas turbine engine including an acoustically treated center plug, in accordance with various embodiments.

Referring now to FIG. 2, a schematic illustration of a core exhaust system 200, such as, for example, the core exhaust system 126 described above, is provided. In various embodiments, the core exhaust system 200 includes an exhaust nozzle 202 and a center body 204, similar to the exhaust nozzle 159 and the exhaust center body 158 described above. The center body 204 may be formed in two sections, including, for example, a center plug 206 and an aft cone 208. The exhaust nozzle 202 and the center plug 206 cooperate to form an annulus 210 through which exhaust gasses from a combustor section exit the core exhaust system 200. In various embodiments, the center plug 206 and the aft cone 208 are connected along a circumferential seam 212 at an aft end of the center plug 206. In the illustrated embodiment, the aft portion of the center plug 206 and the aft cone 208 extend aft from an aft end of the exhaust nozzle 202. The radially outer surfaces of the center plug 206 and the aft cone 208 combine to form a flow control surface that substantially prevents recirculation of the exiting exhaust gasses and facilitates convergence of the exhaust gasses as they exit the annulus 210. The center plug 206 forms a transition between an aft end of a turbine rotor (not shown) located just inside the core exhaust system 200 and the aft cone 208. In various embodiments, the center plug 206 and the aft cone 208 may have hollow center portions that permit cooling air to pass from an intake 214 at an aft tip of the aft cone 208 to internal portions of the engine or to house instrumentation, wiring, or the like.

Figure 3A:
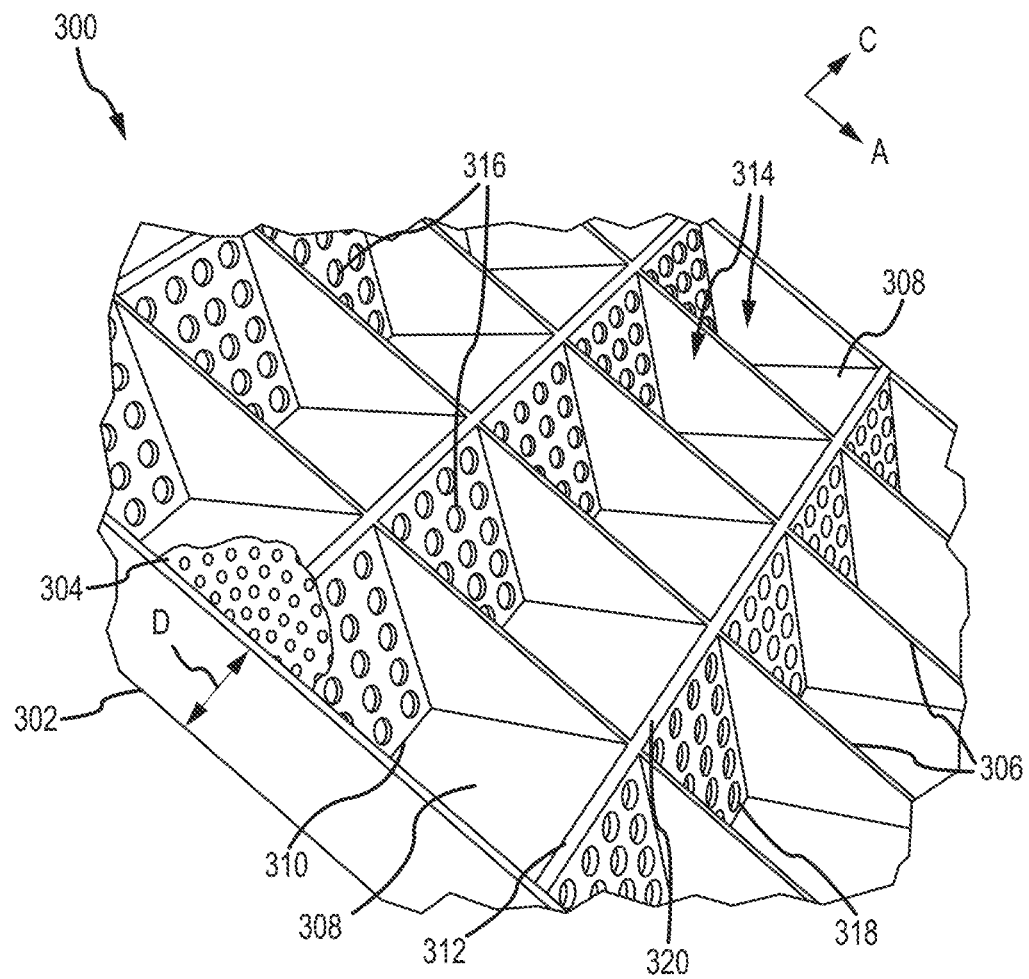
FIGS. 3A and 3B provide perspective and cross-sectional schematic views of an acoustic noise attenuation panel, in accordance with various embodiments.
Figure 3B:
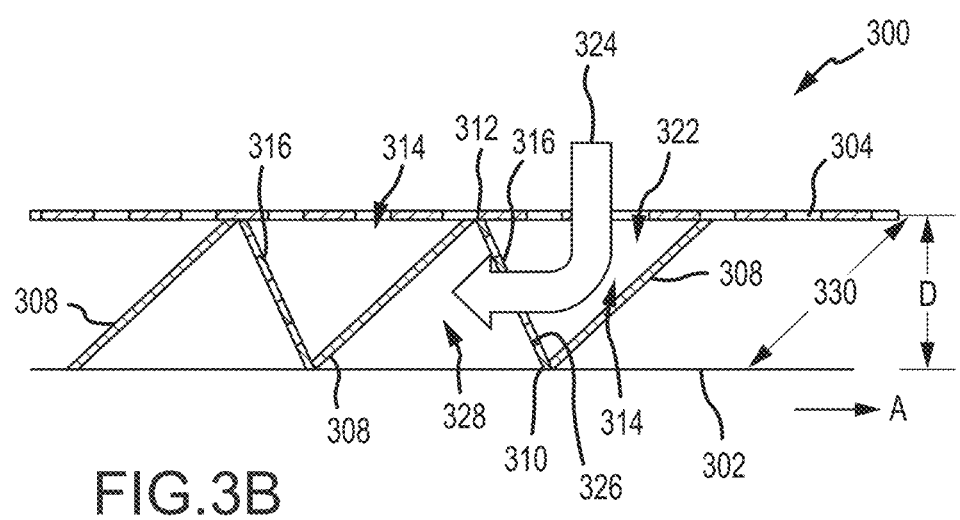

Referring now to FIGS. 3A and 3B, a noise attenuation panel 300, suitable for use as a noise attenuation structure in a center body of a gas turbine engine is illustrated. In various embodiments, the noise attenuation panel 300 (sometimes referred to as an N-core attenuation panel) includes a non-perforated back panel 302 (hidden) and a perforated face sheet 304 that is parallel to and spaced from the non-perforated back panel 302 by a distance D. A plurality of sidewalls 306 extend longitudinally in an axial direction A and engage with the non-perforated back panel 302 and the perforated face sheet 304. The sidewalls among the plurality of sidewalls 306 are spaced from one-another in a circumferential direction C and are substantially normal to the non-perforated back panel 302 and the perforated face sheet 304. A plurality of non-perforated walls 308 extend through the plurality of sidewalls 306, each having a first edge 310 and a second edge 312, with the first edge 310 being engaged to the non-perforated back panel 302 and the second edge 312 being engaged to the perforated face sheet 304. A plurality of cells 314 of the noise attenuation panel 300 are defined by and between the non-perforated back panel 302 and the perforated face sheet 304, the plurality of sidewalls 306 and the plurality of non-perforated walls 308. A plurality of perforated walls 316 extend longitudinally through the plurality of sidewalls 306, each having a first edge 318 and a second edge 320, with the first edge 318 being engaged to the non-perforated back panel 302 and the second edge 320 being engaged to the perforated face sheet 304. The plurality of non-perforated walls 308 and the plurality of perforated walls 316 may be one continuous fold panel, folded along the respective first edges (310, 318) and again at the respective second edges (312, 320).

In operation, an airstream flows across the perforated face sheet 304 and in a shearing direction with respect to the perforated face sheet 304. Noise from this airstream generally enters each of the plurality of cells 314 (e.g., a first cell 322) along a flow path 324 that extends through the perforations in the perforated face sheet 304. The flow path 324 then extends through the perforations of the plurality of perforated walls 316 (e.g., a perforated wall 326) and into adjacent cells (e.g., a second cell 328 on the other side of the perforated wall 326). Because of the angular relationship of the plurality of non-perforated walls 308 and the plurality of perforated walls 316, a length 330 of the flow path 324 is greater than the distance D between the non-perforated back panel 302 and the perforated face sheet 304 panels. This length difference (or increase in path length from more traditional acoustic panels) is advantageous for attenuating low-frequency noise. Furthermore, noise attenuation panel 300 may be thinner than more traditional acoustic liners.

Figure 4A:
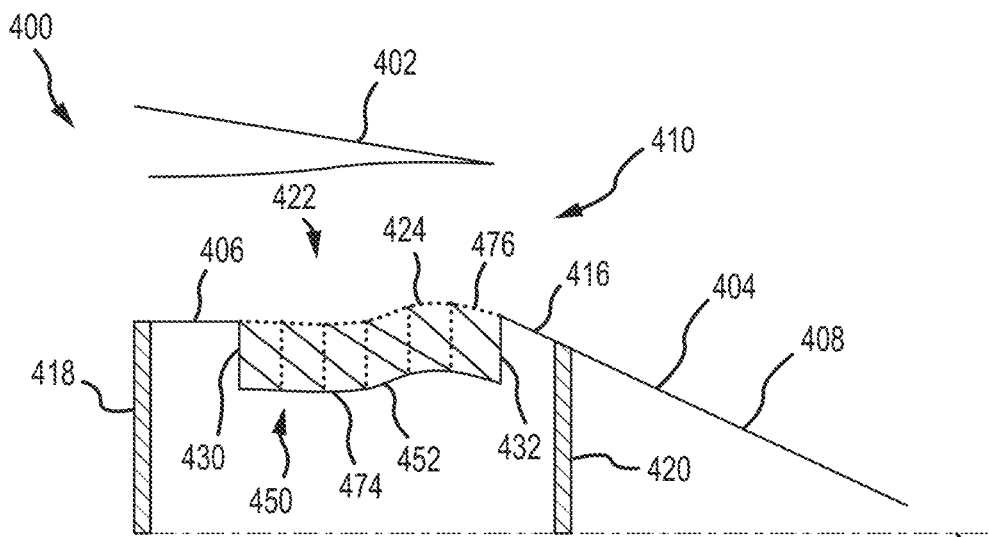
FIGS. 4A, 4B and 4C provide cross-sectional views of a core exhaust system and an acoustic panel used within the core exhaust system, in accordance with various embodiments.
Figure 4B:
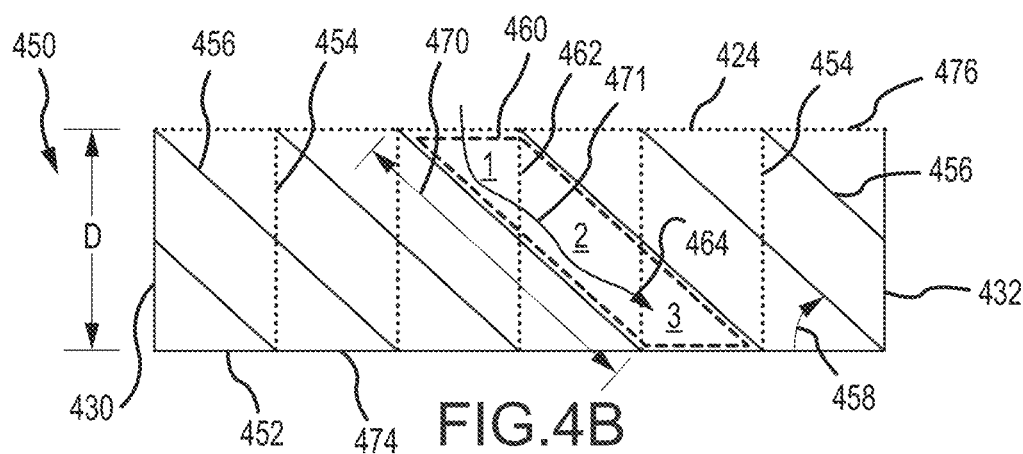
Figure 4C:
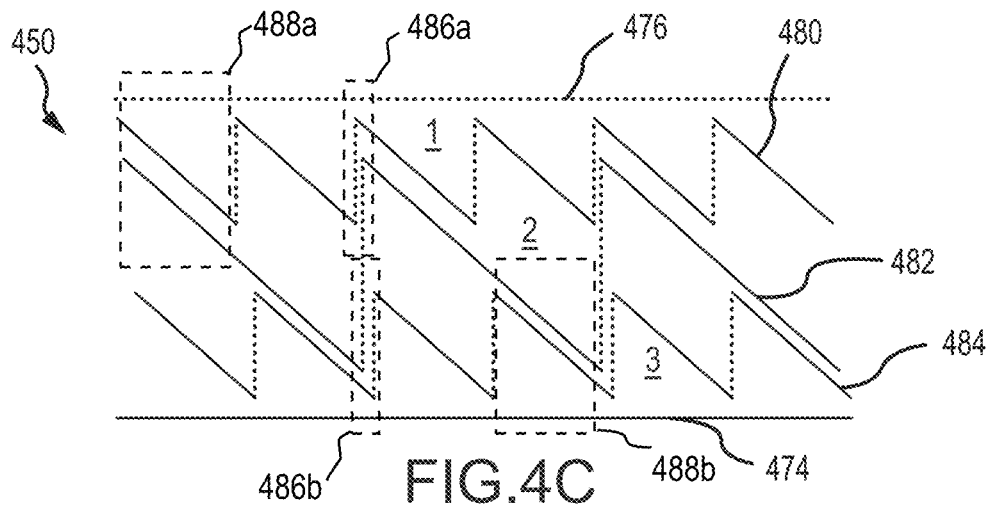

Referring now to FIGS. 4A, 4B and 4C, cross-sectional views of a core exhaust system 400 and an acoustic panel 450 used within the core exhaust system 400 are illustrated. In various embodiments, the core exhaust system 400 includes an exhaust nozzle 402 and a center body 404, similar to the exhaust nozzle 202 and the center body 204 described above. The center body 404 may be formed in two sections, including, for example, a center plug 406 and an aft cone 408, similar to those described above. The exhaust nozzle 402 and the center plug 406 cooperate to form an annulus 410 through which exhaust gasses from a combustor section exit the core exhaust system 400. The center plug 406 includes an outer skin 416 having an aerodynamic outer contour. In various embodiments, the outer contour has a substantially cylindrical shape, meaning the shape need not be perfectly cylindrical, but may vary in the radial direction as the axial direction is traversed from a forward end of the center plug 406 to an aft end of the center plug 406. The center plug 406 may have a forward flange 418 configured for attachment to a casing proximate an aft end of a turbine rotor and an aft flange 420 configured for attachment to the aft cone 408. As illustrated, the outer skin 416 may include an acoustically perforated portion 422 located on a forward portion of the outer skin 416 and extending around substantially the entire circumference of the forward portion of the outer skin 416. The acoustically perforated portion 422 may be formed by one or more pluralities of perforations or, as illustrated, comprise a perforated surface 424 that extends substantially circumferentially about a central axis A extending longitudinally through the center plug 406.

The acoustic panel 450 is positioned radially inward of the acoustically perforated portion 422, such that the acoustic panel 450 is in fluid communication with the exhaust gases exiting the core exhaust system 400. The acoustic panel 450 is also positioned radially outside of an inner skin 452, which is typically non-perforated. A forward bulkhead 430 and an aft bulkhead 432 sandwich the acoustic panel 450 in the axial direction. In various embodiments, the acoustic panel 450 is disposed within a volume defined by the acoustically perforated portion 422, the inner skin 452, the forward bulkhead 430 and the aft bulkhead 432. The acoustic panel 450 is constructed to have a plurality of perforated walls 454 (e.g., a first perforated wall, a second perforated wall, etc.) and a plurality of non-perforated walls 456 (e.g., a first non-perforated wall, a non-second perforated wall, etc.), similar to those described above with reference to FIGS. 3A and 3B. In various embodiments, each wall of the plurality of perforated walls 454 is oriented in a radial direction with respect to the central axis A and each wall of the plurality of non-perforated walls 456 is oriented at an angle 458 with respect to the central axis A. The orientations of the plurality of perforated walls 454 and the plurality of the non-perforated walls 456 provides a pattern of resonator cavities, such as, for example, the resonator cavity 460 indicated by the dashed lines. Note that in various embodiments, the wall comprising the plurality of perforated walls 454 oriented in the radial direction may be oriented in a substantially radial direction (e.g., perpendicular to the central axis A), as illustrated in FIG. 4B, with respect to the central longitudinal axis A, or within a range from about minus ten degrees (−10°) to about plus ten degrees (10°) from the radial direction with respect to the central longitudinal axis A. In addition, in various embodiments, the walls comprising the plurality of non-perforated walls 456 may be oriented at the angle 458 with respect to a central longitudinal axis A of the center plug 406 such that a cone-like structure is formed, with the angle 458 ranging from about forty degrees (40°) to about eighty degrees (80°), or from about fifty degrees (50°) to about seventy degrees (70°) or being on the order of about sixty degrees (60°).

With reference to the resonator cavity 460, during operation, an exhaust stream transits and exits the annulus 410 formed by the exhaust nozzle 402 and the center plug 406. Non-attenuated acoustic waves from the exhaust stream enter the perforated surface 424 and into the resonator cavity 460 where attenuation occurs. The non-attenuated acoustic waves of the exhaust stream enter a first sub-cavity 1 and then a second sub-cavity 2 via a first perforated wall 462. The acoustic waves then enter a third sub-cavity 3 via a second perforated wall 464. The acoustic waves are then reflected off the inner skin 452 and pass back through the second sub-cavity 2 and the first sub-cavity 1 before exiting the resonator cavity 460 as attenuated acoustic waves via the perforated surface 424. Because of the angular relationship of the plurality of perforated walls 454 and the plurality of non-perforated walls 456, a path length 470 of a flow path 471 of the acoustic waves is greater than a distance D (or a radial depth) between the inner skin 452 (which, in various embodiments, forms a non-perforated back panel 474) and the perforated surface 424 (which, in various embodiments, forms a perforated face sheet 476). As described above with reference to FIGS. 3A and 3B, the increase in length of the path length 470 over the distance D is advantageous for attenuating low-frequency noise.

Referring to FIG. 4C, the plurality of perforated walls 454 and the plurality of non-perforated walls 456 that are comprised within the acoustic panel 450 may be fabricated out of a plurality of sheets, which, in various embodiments, includes a first sheet 480, a second sheet 482 and a third sheet 484. As illustrated, the first sheet 480 comprises a first plurality of perforated walls and a first plurality of non-perforated walls, the second sheet 482 comprises a second plurality of perforated walls and a second plurality of non-perforated walls and the third sheet 484 comprises a third plurality of perforated walls and a third plurality of non-perforated walls. The first sheet 480 and the third sheet 484 comprise repeating patterns of perforated walls (or a first repeating structure and a third repeating structure) oriented in a radial direction with respect to the central axis A and non-perforated walls oriented at the angle 458 to form an N-shaped pattern having a pattern frequency N (or a first pattern frequency N), with each of the perforated walls having a length in the radial direction equal to D/2. The second sheet 482 comprises a repeating pattern of perforated walls (or a second repeating structure) oriented in a radial direction with respect to the central axis A and non-perforated walls oriented at the angle 458 to form an N-shaped pattern having a pattern frequency N/2 (or a second pattern frequency N/2), with each of the perforated walls having a length in the radial direction equal to D. To form the acoustic panel 450 illustrated in FIG. 4B, each of the first sheet 480, the second sheet 482 and the third sheet 484 is fabricated, typically using sheet metal, and then sandwiched together to form the plurality of perforated walls 454 and the plurality of non-perforated walls 456. In various embodiments, the non-perforated back panel 474 and the perforated face sheet 476 may be added to the plurality of perforated walls 454 and the plurality of non-perforated walls 456 to form the acoustic panel 450 or, in various embodiments, the N-shaped structure comprising the plurality of perforated walls 454 and the plurality of non-perforated walls 456 (or a combined plurality of perforated walls forming structures 486*a* and 486*b*, combining the perforated wall 454 of the first sheet 480 and a first portion of the perforated wall 454 of the second sheet 482, and the perforated wall 454 of the third sheet 484 and a second portion of the perforated wall 454 of the second sheet 482, respectively, and a combined plurality of non-perforated walls forming structures 488*a* and 488*b*, combining the non-perforated wall 456 of the first sheet 480 and a first portion of the non-perforated wall 456 of the second sheet 482, and the non-perforated wall 456 of the third sheet 484 and a second portion of the non-perforated wall 456 of the second sheet 482, respectively) is sandwiched between the perforated surface 424 and the inner skin 452 to form the acoustic panel 450.

Figure 5A:
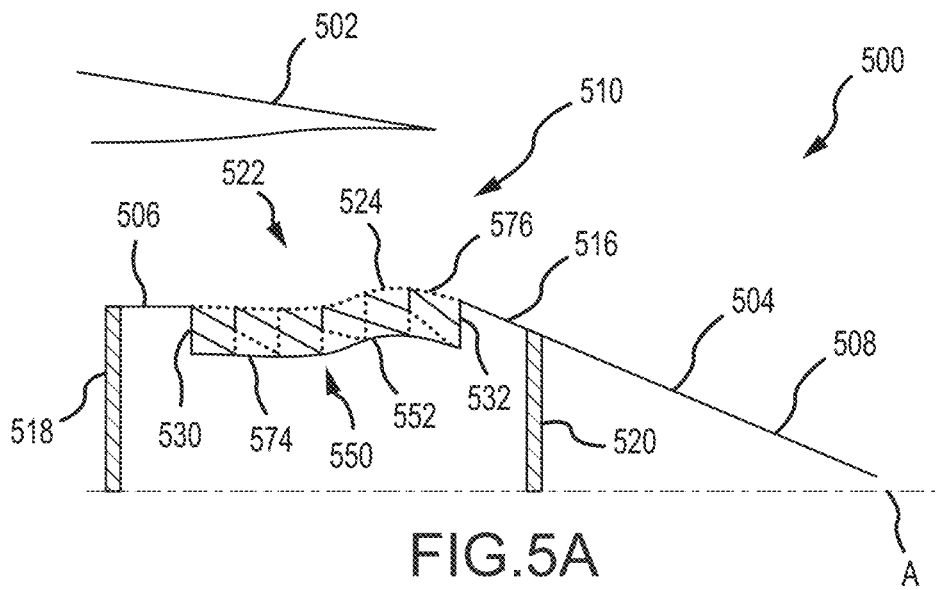
FIGS. 5A, 5B and 5C provide cross-sectional views of a core exhaust system and various views of an acoustic panel used within the core exhaust system, in accordance with various embodiments.
Figure 5B:
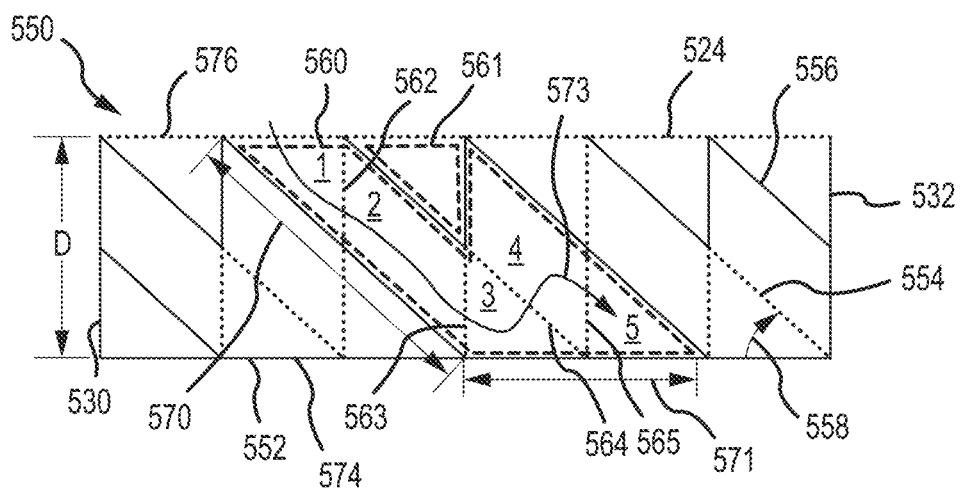
Figure 5C:
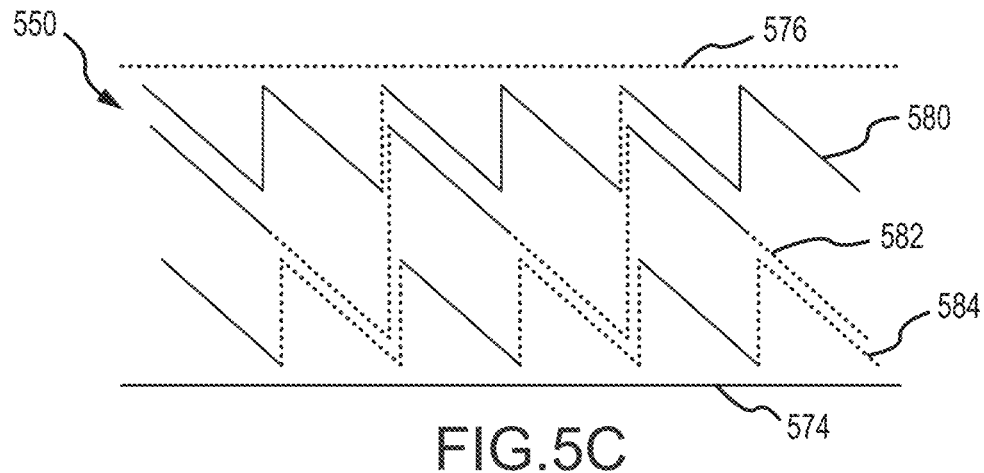

Referring now to FIGS. 5A, 5B and 5C, cross-sectional views of a core exhaust system 500 and an acoustic panel 550 used within the core exhaust system 500 are illustrated. In various embodiments, the core exhaust system 500 includes an exhaust nozzle 502 and a center body 504, similar to the exhaust nozzle 202 and the center body 204 described above. The center body 504 may be formed in two sections, including, for example, a center plug 506 and an aft cone 508, similar to those described above. The exhaust nozzle 502 and the center plug 506 cooperate to form an annulus 510 through which exhaust gasses from a combustor section exit the core exhaust system 500. The center plug 506 includes an outer skin 516 having an aerodynamic outer contour. The center plug 506 may have a forward flange 518 configured for attachment to a casing proximate an aft end of a turbine rotor and an aft flange 520 configured for attachment to the aft cone 508. As illustrated, the outer skin 516 may include an acoustically perforated portion 522 located on a forward portion of the outer skin 516 and extending around substantially the entire circumference of the forward portion of the outer skin 516. The acoustically perforated portion 522 may be formed by one or more pluralities of perforations or, as illustrated, comprise a perforated surface 524 that extends substantially circumferentially about a central axis A extending longitudinally through the center plug 506.

The acoustic panel 550 is positioned radially inward of the acoustically perforated portion 522, such that the acoustic panel 550 is in fluid communication with the exhaust gases exiting the core exhaust system 500. The acoustic panel 550 is also positioned radially outside of an inner skin 552, which is typically non-perforated. A forward bulkhead 530 and an aft bulkhead 532 sandwich the acoustic panel 550 in the axial direction. The acoustic panel 550 is constructed to have a plurality of perforated walls 554 and a plurality of non-perforated walls 556, similar to those described above with reference to FIGS. 3A and 3B. In various embodiments, the walls of the plurality of perforated walls 554 are oriented in either a radial direction with respect to the central axis A or at an angle 558 with respect to the central axis A and, similarly, the walls of the plurality of non-perforated walls 556 are oriented in either the radial direction with respect to the central axis A or at the angle 558 with respect to the central axis A. The orientations of the plurality of perforated walls 554 and the plurality of the non-perforated walls 556 provides a pattern of resonator cavities, such as, for example, a first resonator cavity 560 indicated by the dashed lines.

With reference to the first resonator cavity 560, during operation, an exhaust stream transits and exits the annulus 510 formed by the exhaust nozzle 502 and the center plug 506. Non-attenuated acoustic waves from the exhaust stream enter the perforated surface 524 and into the first resonator cavity 560 where attenuation occurs. The non-attenuated acoustic waves of the exhaust stream enter a first sub-cavity 1 and then a second sub-cavity 2 via a first perforated wall 562. The acoustic waves then enter a third sub-cavity 3 via a second perforated wall 563, followed by a fourth sub-cavity 4 via a third perforated wall 564 and then a fifth sub-cavity 5 via a fourth perforated wall 565. The acoustic waves are then reflected off the inner skin 552 and pass back through the fourth sub-cavity 4, the third sub-cavity 3, the second sub-cavity 2 and the first sub-cavity 1 before exiting the first resonator cavity 560 as attenuated acoustic waves via the perforated surface 524. Because of the angular relationship of the plurality of perforated walls 554 and the plurality of non-perforated walls 556, a path length (approximately equal to an angled distance 570 and an axial distance 571) of a flow path 573 of the acoustic waves is greater than a distance D between the inner skin 552 (which, in various embodiments, forms a non-perforated back panel 574) and the perforated surface 524 (which, in various embodiments, forms a perforated face sheet 576). As described above with reference to FIGS. 3A and 3B, the increase in length of the path length over the distance D is advantageous for attenuating low-frequency noise. As illustrated, a second resonator cavity 561 having a path length substantially less than D is also formed by the orientations of the plurality of perforated walls 554 and the plurality of the non-perforated walls 556.

Referring to FIG. 5C, the plurality of perforated walls 554 and the plurality of non-perforated walls 556 that are comprised within the acoustic panel 550 may be fabricated out of a plurality of sheets, which, in various embodiments, includes a first sheet 580, a second sheet 582 and a third sheet 584. As illustrated, the first sheet 580 comprises a first repeating pattern of perforated walls and non-perforated walls, the second sheet 582 comprises a second repeating pattern of perforated walls and non-perforated walls, and the third sheet 584 comprises a third repeating pattern of perforated walls and non-perforated walls. To form the acoustic panel 550 illustrated in FIG. 5B, each of the first sheet 580, the second sheet 582 and the third sheet 584 is fabricated, typically using sheet metal, and then sandwiched together to form the plurality of perforated walls 554 and the plurality of non-perforated walls 556, having an N-shaped structure as illustrated. In various embodiments, the non-perforated back panel 574 and the perforated face sheet 576 may be added to the plurality of perforated walls 554 and the plurality of non-perforated walls 556 to form the acoustic panel 550 or, in various embodiments, the N-shaped structure comprising the plurality of perforated walls 554 and the plurality of non-perforated walls 556 is sandwiched between the perforated surface 524 and the inner skin 552 to form the acoustic panel 550.

Figures 6A, 6B, 6C:
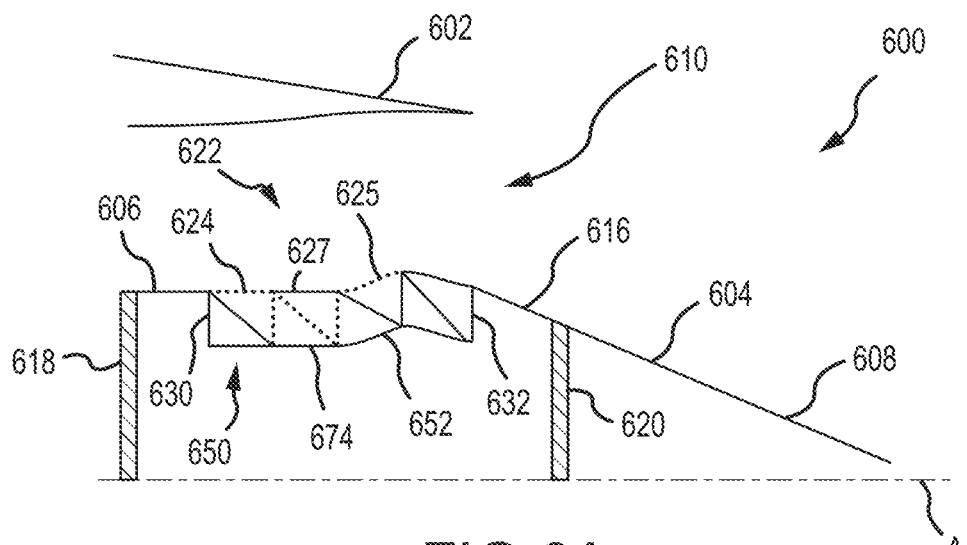
FIGS. 6A, 6B and 6C provide cross-sectional views of a core exhaust system and various views of an acoustic panel used within the core exhaust system, in accordance with various embodiments.
Figure 7A:
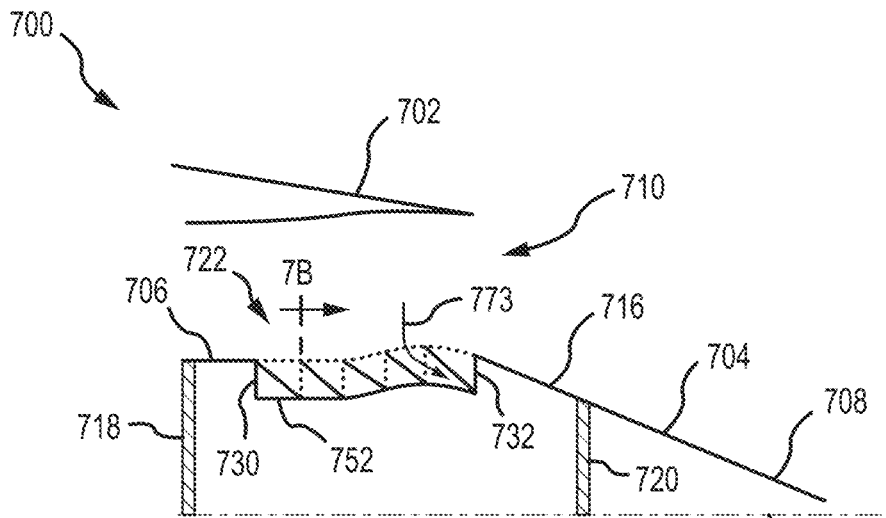
FIGS. 7A, 7B, 7C and 7D provide cross-sectional views of a core exhaust system and various views of an acoustic panel used within the core exhaust system, in accordance with various embodiments.
Figure 7B:
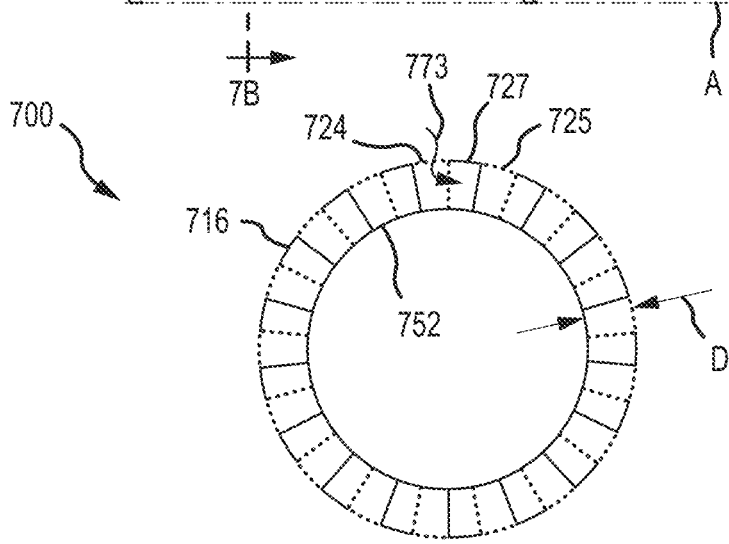
Figure 7C:
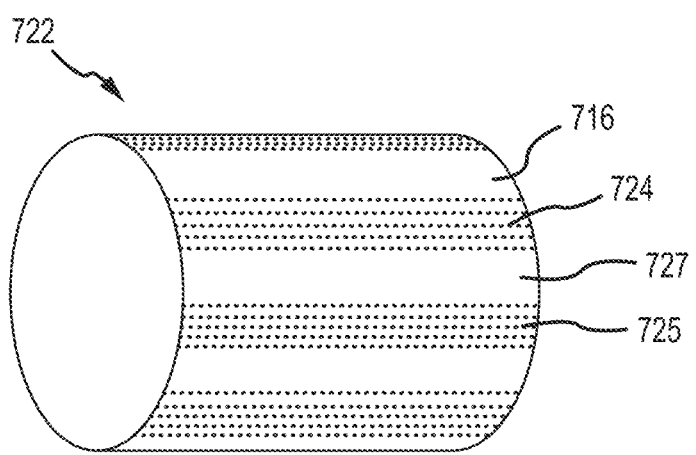
Figure 7D:
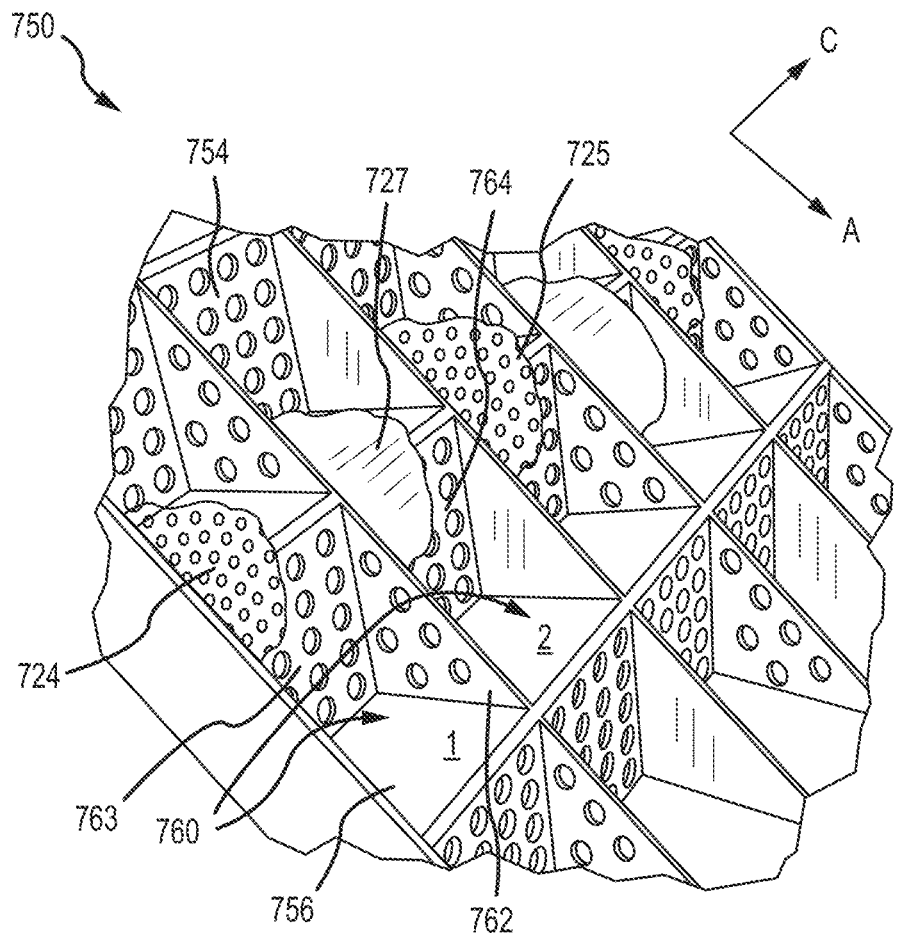

Referring now to FIGS. 6A, 6B and 6C, various cross-sectional and perspective views of a core exhaust system 600 and an acoustic panel 650 used within the core exhaust system 600 are illustrated. In various embodiments, the core exhaust system 600 includes an exhaust nozzle 602 and a center body 604, similar to the exhaust nozzle 202 and the center body 204 described above. The center body 604 may be formed in two sections, including, for example, a center plug 606 and an aft cone 608, similar to those described above. The exhaust nozzle 602 and the center plug 606 cooperate to form an annulus 610 through which exhaust gasses from a combustor section exit the core exhaust system 600. The center plug 606 includes an outer skin 616 having an aerodynamic outer contour. The center plug 606 may have a forward flange 618 configured for attachment to a casing proximate an aft end of a turbine rotor and an aft flange 620 configured for attachment to the aft cone 608. As illustrated, the outer skin 616 may include an acoustically perforated portion 622 located on a forward portion of the outer skin 616 and extending around substantially the entire circumference of the forward portion of the outer skin 616. The acoustically perforated portion 622 may be formed by one or more pluralities of perforations or, as illustrated, comprise a first perforated surface 624 and a second perforated surface 625 that extend substantially circumferentially about a central axis A extending longitudinally through the center plug 606, with the second perforated surface 625 being spaced an axial distance from the first perforated surface 624.

The acoustic panel 650 is positioned radially inward of the acoustically perforated portion 622, such that the acoustic panel 650 is in fluid communication with the exhaust gases exiting the core exhaust system 600. The acoustic panel 650 is also positioned radially outside of an inner skin 652, which is typically non-perforated. A forward bulkhead 630 and an aft bulkhead 632 sandwich the acoustic panel 650 in the axial direction. The acoustic panel 650 is constructed to have a plurality of perforated walls 654 and a plurality of non-perforated walls 656, similar to those described above with reference to FIGS. 3A and 3B. In various embodiments, the walls of the plurality of perforated walls 654 are oriented in either a radial direction with respect to the central axis A or at an angle 658 with respect to the central axis A and, similarly, the walls of the plurality of non-perforated walls 656 are oriented in either the radial direction with respect to the central axis A or at the angle 658 with respect to the central axis A. The orientations of the plurality of perforated walls 654 and the plurality of the non-perforated walls 656 provide a pattern of resonator cavities, such as, for example, a resonator cavity 660 indicated by the dashed lines.

With reference to the resonator cavity 660, during operation, an exhaust stream transits and exits the annulus 610 formed by the exhaust nozzle 602 and the center plug 606. Non-attenuated acoustic waves from the exhaust stream enter the first perforated surface 624 and into the resonator cavity 660 where attenuation occurs. The non-attenuated acoustic waves of the exhaust stream enter a first sub-cavity 1 and then a second sub-cavity 2 via a first perforated wall 662. The acoustic waves then enter a third sub-cavity 3 via a second perforated wall 663, followed by a fourth sub-cavity 4 via a third perforated wall 664. The acoustic waves are then reflected off the inner skin 652 and pass back through the third sub-cavity 3, the second sub-cavity 2 and the first sub-cavity 1 before exiting the resonator cavity 660 as attenuated acoustic waves via the first perforated surface 624. Because of the angular relationship of the plurality of perforated walls 654 and the plurality of non-perforated walls 656, a path length of a flow path 673 of the acoustic waves is greater than a distance D between the inner skin 652 and the outer skin 616. As described above with reference to FIGS. 3A and 3B, the increase in length of the path length over the distance D is advantageous for attenuating low-frequency noise. While only the resonator cavity 660 is illustrated in fluid communication with the acoustically perforated portion 622, it will be appreciated that a series of such resonator cavities may be fabricated, such that a first resonator cavity (e.g., the resonator cavity 660) is in fluid communication with the first perforated surface 624 and a second resonator cavity (which may be substantially identical to or different than the first resonator cavity) is in fluid communication with the second perforated surface 625. As illustrated, a non-perforated surface 627 is disposed between the first perforated surface 624 and the second perforated surface 625. In various embodiments, the acoustic panel 650 may be fabricated using the same procedures described above with reference to FIGS. 4C and 5C to form an N-shaped structure comprising the plurality of perforated walls 654 and the plurality of non-perforated walls 656.

Referring now to FIGS. 7A, 7B, 7C and 7D, various cross-sectional and perspective views of a core exhaust system 700 and an acoustic panel 750 used within the core exhaust system 700 are illustrated. In various embodiments, the core exhaust system 700 includes an exhaust nozzle 702 and a center body 704, similar to the exhaust nozzle 202 and the center body 204 described above. The center body 704 may be formed in two sections, including, for example, a center plug 706 and an aft cone 708, similar to those described above. The exhaust nozzle 702 and the center plug 706 cooperate to form an annulus 710 through which exhaust gasses from a combustor section exit the core exhaust system 700. The center plug 706 includes an outer skin 716 having an aerodynamic outer contour. The center plug 706 may have a forward flange 718 configured for attachment to a casing proximate an aft end of a turbine rotor and an aft flange 720 configured for attachment to the aft cone 708. As illustrated, the outer skin 716 may include an acoustically perforated portion 722 located on a forward portion of the outer skin 716 and extending around circumference of the forward portion of the outer skin 716 in the form of axially extending perforated strips separated by axially extending non-perforated strips. The acoustically perforated portion 722 may be formed by one or more pluralities of perforations or, as illustrated, comprise a first perforated surface 724 and a second perforated surface 725 that extend substantially axially along or parallel to a central axis A extending longitudinally through the center plug 706, with the second perforated surface 725 being spaced a circumferential distance from the first perforated surface 724 by a non-perforated surface 727.

The acoustic panel 750 is positioned radially inward of the acoustically perforated portion 722, such that the acoustic panel 750 is in fluid communication with the exhaust gases exiting the core exhaust system 700. The acoustic panel 750 is also positioned radially outside of an inner skin 752, which is typically non-perforated. A forward bulkhead 730 and an aft bulkhead 732 sandwich the acoustic panel 750 in the axial direction. The acoustic panel 750 is constructed to have a plurality of perforated walls 754 and a plurality of non-perforated walls 756, similar to those described above with reference to FIGS. 3A and 3B. In various embodiments, the walls of the plurality of perforated walls 754 are oriented in a radial direction with respect to the central axis A and the walls of the plurality of non-perforated walls 756 are oriented at an angle with respect to the central axis A. The orientations of the plurality of perforated walls 754 and the plurality of the non-perforated walls 756 provide a pattern of resonator cavities, such as, for example, a resonator cavity 760.

With reference to the resonator cavity 760, during operation, an exhaust stream transits and exits the annulus 710 formed by the exhaust nozzle 702 and the center plug 706. Non-attenuated acoustic waves from the exhaust stream enter the first perforated surface 724 and into the resonator cavity 760 where attenuation occurs. The non-attenuated acoustic waves of the exhaust stream enter a first sub-cavity 1 and then a second sub-cavity 2 via a first perforated wall 762. The acoustic waves in the first sub-cavity 1 then enter a third sub-cavity via a second perforated wall 763 (the third sub-cavity is on the opposite side of the second perforated wall 763), while the acoustic waves in the second sub-cavity 2 then enter a fourth sub-cavity via a third perforated wall 764 (the fourth sub-cavity is on the opposite side of the third perforated wall 764). The acoustic waves are then reflected off the inner skin 752 and pass back through the second sub-cavity 2 and the first sub-cavity 1 before exiting the resonator cavity 760 as attenuated acoustic waves via the first perforated surface 724. Because of the angular relationship of the plurality of perforated walls 754 and the plurality of non-perforated walls 756, a path length of a flow path 773 of the acoustic waves is greater than a distance D between the inner skin 752 and the outer skin 716. As described above with reference to FIGS. 3A and 3B, the increase in length of the path length over the distance D is advantageous for attenuating low-frequency noise. While only the resonator cavity 760 is illustrated in fluid communication with the acoustically perforated portion 722, it will be appreciated that a series of such resonator cavities may be fabricated, such that a first resonator cavity (e.g., the resonator cavity 760) is in fluid communication with the first perforated surface 724 and a second resonator cavity (which may be substantially identical to or different than the first resonator cavity) is in fluid communication with the second perforated surface 725. In various embodiments, the acoustic panel 750 may be fabricated using the same procedures described above with reference to FIGS. 4C and 5C to form an N-shaped structure comprising the plurality of perforated walls 754 and the plurality of non-perforated walls 756.

Figure 8A:
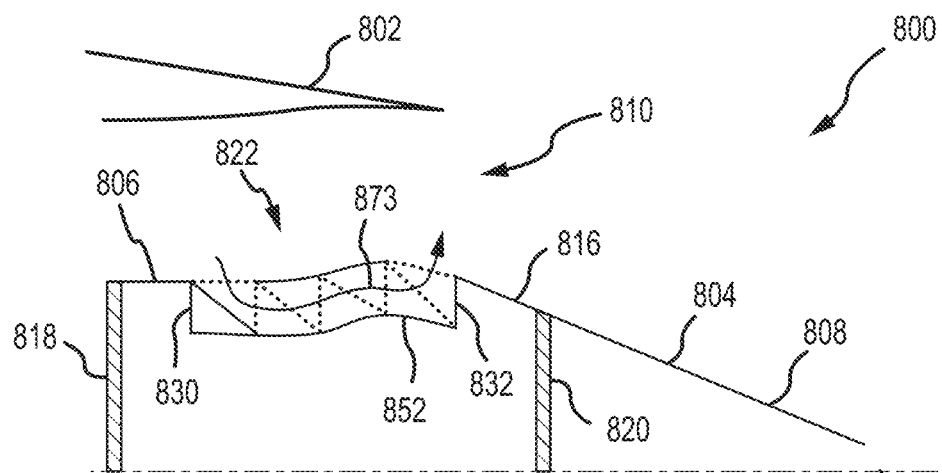
FIGS. 8A, 8B and 8C provide cross-sectional views of a core exhaust system and an acoustic panel used within the core exhaust system, in accordance with various embodiments.
Figure 8B:
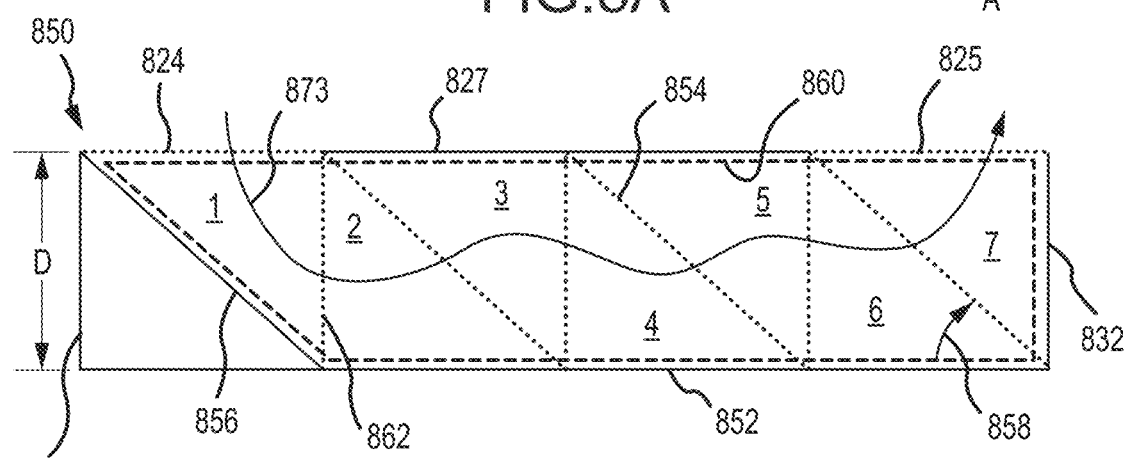
Figure 8C:
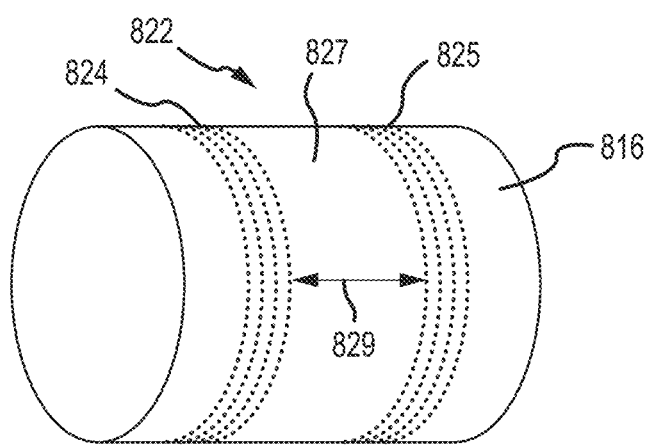

Referring now to FIGS. 8A, 8B and 8C, various cross-sectional and perspective views of a core exhaust system 800 and an acoustic panel 850 used within the core exhaust system 800 are illustrated. In various embodiments, the core exhaust system 800 includes an exhaust nozzle 802 and a center body 804, similar to the exhaust nozzle 202 and the center body 204 described above. The center body 804 may be formed in two sections, including, for example, a center plug 806 and an aft cone 808, similar to those described above. The exhaust nozzle 802 and the center plug 806 cooperate to form an annulus 810 through which exhaust gasses from a combustor section exit the core exhaust system 800. The center plug 806 includes an outer skin 816 having an aerodynamic outer contour. The center plug 806 may have a forward flange 818 configured for attachment to a casing proximate an aft end of a turbine rotor and an aft flange 820 configured for attachment to the aft cone 808. As illustrated, the outer skin 816 may include an acoustically perforated portion 822 located on a forward portion of the outer skin 816 and extending around substantially the entire circumference of the forward portion of the outer skin 816. The acoustically perforated portion 822 may be formed by one or more pluralities of perforations or, as illustrated, comprise a first perforated surface 824 and a second perforated surface 825 that extend substantially circumferentially about a central axis A extending longitudinally through the center plug 806, with the second perforated surface 825 being spaced an axial distance from the first perforated surface 824 by a non-perforated surface 827.

The acoustic panel 850 is positioned radially inward of the acoustically perforated portion 822, such that the acoustic panel 850 is in fluid communication with the exhaust gases exiting the core exhaust system 800. The acoustic panel 850 is also positioned radially outside of an inner skin 852, which is typically non-perforated. A forward bulkhead 830 and an aft bulkhead 832 sandwich the acoustic panel 850 in the axial direction. The acoustic panel 850 is constructed to have a plurality of perforated walls 854 and a plurality of non-perforated walls 856, similar to those described above with reference to FIGS. 3A and 3B. In various embodiments, the walls of the plurality of perforated walls 854 are oriented in either a radial direction with respect to the central axis A or at an angle 858 with respect to the central axis A and the walls of the plurality of non-perforated walls 856 are oriented at the angle 858 with respect to the central axis A. The orientations of the plurality of perforated walls 854 and the plurality of the non-perforated walls 856 provide a pattern of resonator cavities, such as, for example, a resonator cavity 860 indicated by the dashed lines.

With reference to the resonator cavity 860, during operation, an exhaust stream transits and exits the annulus 810 formed by the exhaust nozzle 802 and the center plug 806. Non-attenuated acoustic waves from the exhaust stream enter the first perforated surface 824 and into the resonator cavity 860 comprised of a plurality of sub-cavities where attenuation occurs. The non-attenuated acoustic waves of the exhaust stream enter a first sub-cavity 1 and then a second sub-cavity 2 via a first perforated wall 862. The acoustic waves then enter a third sub-cavity 3, a fourth sub-cavity 4, a fifth sub-cavity 5, a sixth sub-cavity 6 and a seventh sub-cavity 7 (or an Nth sub-cavity), before exiting the resonator cavity 860 as attenuated acoustic waves via the second perforated surface 825, with adjacent sub-cavities being separated by an intervening perforated wall. In various embodiments, the acoustic panel 850 may be fabricated using the same procedures described above with reference to FIGS. 4C and 5C to form an N-shaped structure comprising the plurality of perforated walls 854 and the plurality of non-perforated walls 856.

In addition to the attenuation provided by the multi-resonator cavity configuration of the acoustic panel 850, additional attenuation may be achieved by selecting an axial distance 829 of the non-perforated surface 827 that separates the first perforated surface 824 and the second perforated surface 825 such that Herschel-Quincke attenuation or cancellation takes place. More specifically, a portion of the non-attenuated acoustic waves that travel the annulus 810 exhibit a first phase, a first frequency and a first amplitude (or a first range of such parameters) downstream of the first perforated surface 824. At the same time, the attenuated acoustic waves exiting the second perforated surface 825 exhibit a second phase, a second frequency and a second amplitude (or a second range of such parameters). By selecting the axial distance 829 such that the attenuated acoustic waves exiting the second perforated surface 825 are one-hundred eighty degrees (180°) out of phase with the portion of the non-attenuated acoustic waves that travel the annulus 810, additional attenuation is achieved through noise cancellation. An increase in length of the flow path 873, largely dependent on an increased length of the acoustic structure, e.g., the axial distance 829, is advantageous for attenuating low frequency noise.

Benefits of the noise attenuation structures described above include the ability to attenuate low-frequency noise (e.g., on the order of 200 Hz to 1,000 Hz) via DDOF or multi-degree of freedom cavities that would otherwise be too large to incorporate into a center plug in the form of single degree of freedom (SDOF) resonator cavities. Further, the shape of the perforated and non-perforated walls of the disclosed DDOF resonator cavities (e.g., the cone-shaped non-perforated walls and the disk-shaped perforated walls) enable relative ease of manufacture when compared to the more typical honeycomb-shaped resonator cavities. The shape of the perforated and non-perforated walls also enable the resulting resonator cavities to fit against the compound curvature often exhibited by the outer skin of the center body by attaching the radially outboard edges of a series of perforated sheet metal disks and non-perforated sheet metal cones to the radially inside surface of the forward portion of the center body and the radially inboard edges of the same structures to the radially outside surface of the inner skin of the center body.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A center plug for attenuating noise in a gas turbine engine, comprising:
   an inner skin, the inner skin having a substantially cylindrical shape and extending along an axial centerline;
   an outer skin positioned radially outside the inner skin;

a forward bulkhead disposed proximate a forward end of the inner skin, the forward bulkhead connected to and extending radially outward from the inner skin;

an aft bulkhead disposed proximate an aft end of the inner skin, the aft bulkhead connected to and extending radially outward from the inner skin; and an acoustic panel disposed within a volume defined by the inner skin, the outer skin and the forward bulkhead and the aft bulkhead, the acoustic panel including:

a resonator cavity comprised of a plurality of sub-cavities extending axially along the axial centerline and circumferentially about the axial centerline, the plurality of sub-cavities including a first sub-cavity, a second sub-cavity, and a third sub-cavity, the first sub-cavity being separated from the second sub-cavity in a circumferential direction by a first perforated wall, the second sub-cavity being separated from the third sub-cavity in the circumferential direction by a second perforated wall, a first perforated surface extending in an axial direction and through the outer skin and into the first sub-cavity, a non-perforated surface extending in the axial direction and covering the second sub-cavity, and a second perforated surface extending in the axial direction and through the outer skin and into the third sub-cavity, wherein the second perforated surface is spaced in the circumferential direction from the first perforated surface by the non-perforated surface.

2. The center plug of claim 1, wherein the plurality of sub-cavities is defined by a first plurality of perforated walls oriented within a first range from about minus ten degrees to about plus ten degrees with respect to a radial direction extending perpendicular to the axial centerline.

3. The center plug of claim 2, wherein the plurality of sub-cavities is defined by a second plurality of perforated walls oriented at an angle within a second range from about forty degrees to about eighty degrees with respect to the axial centerline.

4. The center plug of claim 3, wherein the axial direction is selected such that attenuated acoustic waves exiting the second perforated surface are out of phase with non-attenuated acoustic waves transiting downstream of the first perforated surface.

* * * * *